United States Patent

[11] 3,610,566

| [72] | Inventor | Frank J. Rychlik<br>Northbrook, Ill. |
|---|---|---|
| [21] | Appl. No. | 870,611 |
| [22] | Filed | Sept. 19, 1969 |
| [45] | Patented | Oct. 5, 1971 |
| [73] | Assignee | Illinois Tool Works Inc.<br>Chicago, Ill. |

[54] ROCKER CLAMP FOR FLEXIBLE TUBING
5 Claims, 7 Drawing Figs.

[52] U.S. Cl. .................................................. 251/9,
24/126 R, 24/132 R, 24/251
[51] Int. Cl. .................................................. F16k 7/06
[50] Field of Search .................................................. 24/126 R,
132 R, 132 HL, 132 WL, 134 EA, 136 R, 251;
251/4, 6, 9, 10

[56] References Cited
UNITED STATES PATENTS

| 113,016 | 3/1871 | Bunce | 251/9 |
|---|---|---|---|
| 1,421,385 | 7/1922 | Beecken | 24/132 |
| 2,969,064 | 1/1961 | Metz | 251/9 X |
| 3,206,157 | 9/1965 | Reading | 251/9 |
| 3,327,999 | 6/1967 | Mitchell | 24/134 X |

FOREIGN PATENTS

| 13,127 | 3/1891 | Great Britain | 251/9 |

*Primary Examiner*—M. Cary Nelson
*Assistant Examiner*—Richard Gerard
*Attorneys*—Robert W. Beart, Michael Kovac, Barry L. Clark and Jack R. Halvorsen

ABSTRACT: A variable clamp device for controlling fluid flow through resilient tubing. The clamp includes a pair of arcuate body portions each having at least one rigid convex reference surface with the body portions maintained with the reference surface in intimate contact and each body portion including a groove or channel having a varying depth relative to the axial extent of the adjacent reference surface; the opposing channels accepting and acting on the tubing as the convex rockerlike body portions move relatively along the reference surfaces and compress the tubing within the channel.

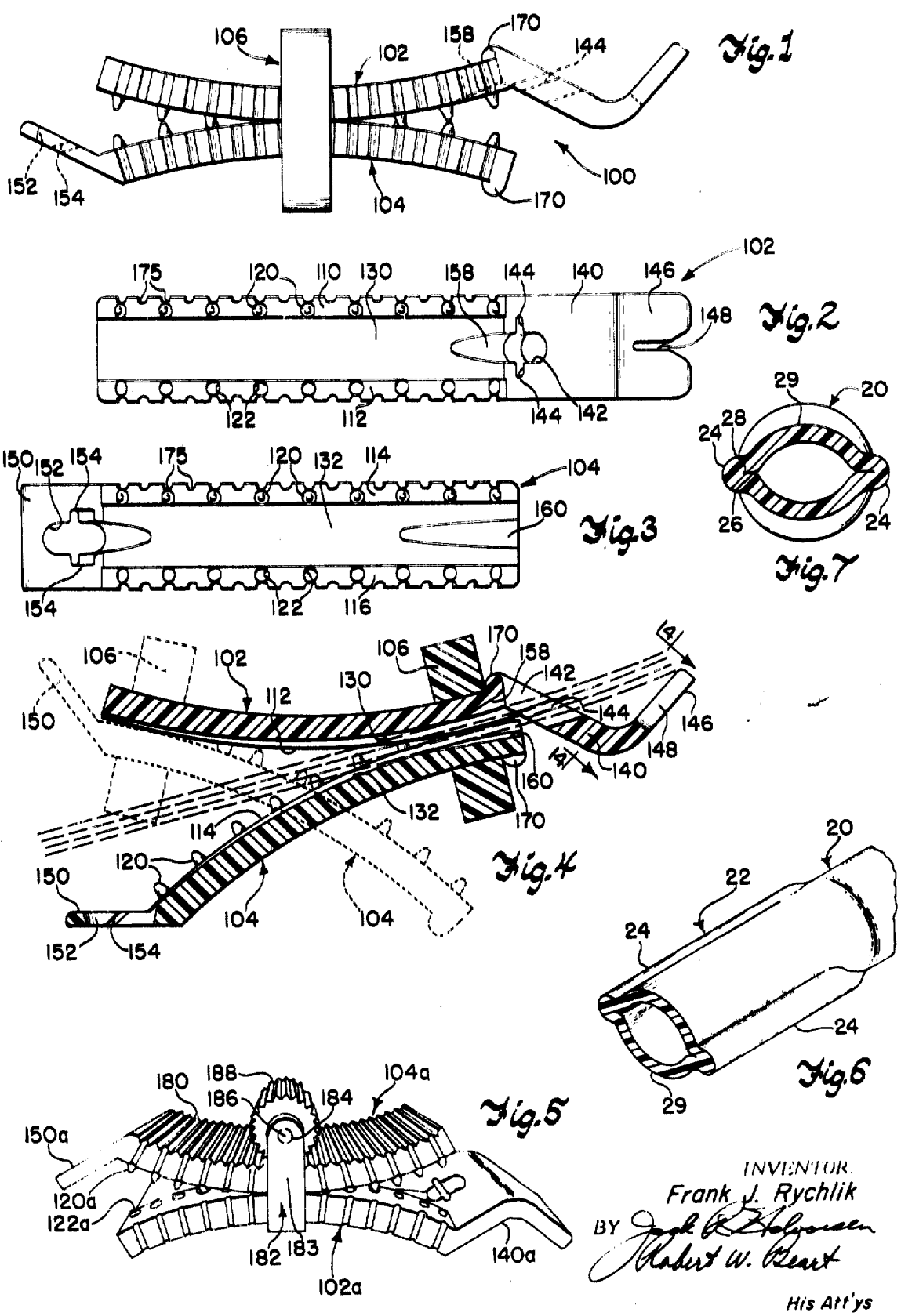

3,610,566

ROCKER CLAMP FOR FLEXIBLE TUBING

BACKGROUND OF THE INVENTION

In the field of hospital and medical equipment it has been found that due to the labor cost factor it is cheaper to use a device only once and discard it rather than to resterilize and repackage the device for additional use. Hence, to reduce initial costs of such equipment it has become quite common to seek lower price materials which can be sterilized, afford an improved aesthetic appearance and which will function in the desired fashion. Certain injection molded and/or extruded plastic materials have been widely utilized as generally inexpensive materials having these properties.

Experience in the use of these materials has revealed that many plastic materials will, under stress as well as normal conditions, relax or "cold flow." Thus, plastic clamps and their associated plastic tubing have been known to cold flow when set for an adjusted rate of fluid flow. In particular, the clamps relax under stress and relieve the pressure they exert on the tubing thereby changing the setting and rate of fluid flow. Similarly, the tubing, which is normally circular in section, will develop teardrop shaped openings at opposite edge extremities of the bore of a newly compressed tube due to the high stress forces set up in compressing the tubing into a tight radius of curvature along opposite edges. After a period of time the tubing will cold flow or relax and close up the openings thereby eliminating or seriously reducing fluid flow through the tubing.

SUMMARY

The invention relates to a variable clamp means for flexible tubing, said claim including a pair of arcuate body portions each having a convex rigid reference surface and a channel on the same side of the body portion which slopes relative to said reference surface and a ringlike member to maintain the body portions in intimate contact on their reference surfaces and movable relative to each other to thereby variably compress the tubing within said channel to control the fluid flow through said tubing. The rigid arcuate body rides in pressure contact on the opposed convex rigid reference surfaces and substantially insures an absence of cold flow in the clamp per se. It is recommended that such a clamp be utilized with an oriented preformed tubing in which opposite sides of an axial portion of the initially circular tubing is crimped and sealed to eliminate the teardrop cold flow susceptible openings when squeezed by a clamp. Such a tubing is set forth in more detail hereinafter as well as in copending application for U.S. Ser. No. 861,967, filed Sept. 29, 1969.

An object of the invention is to provide a clamp for flexible tubing which is virtually free of cold-flow problems and will maintain a predetermined setting until further adjustment by an operator.

A further object is to combine such a clamp with a precrimped tubing which is oriented within the clamp to eliminate cold flow of the tubing.

Still another object of this invention is to provide an economical clamp which can be readily fabricated and will carry out the other objects of this invention.

DRAWING

FIG. 1 is an elevational side view of an embodiment of a clamp contemplated by the present invention;

FIGS. 2 and 3 are plan views of two arcuate body elements making up the clamp of FIG. 1;

FIG. 4 is an elevational view in partial section of the device shown in FIG. 1;

FIG. 5 is a further embodiment of the teachings of the present invention;

FIG. 6 is a perspective view in partial section of a flattened crimped tube of the type contemplated to be used in a clamp of present invention; and FIG. 7 is an end view of the tubing shown in FIG. 6.

DESCRIPTION

Referring now to the drawings wherein similar parts are designated by similar numerals throughout the drawings;

FIG. 6 is a perspective view in partial section of a tube 20 having an axially extending preflattened portion 22. The tube 20 is preferably an extruded plastic tube, such as plasticized vinyl, polytetrafluoroethylene polyethylene, initially having a circular cross-sectional form and then partially flattened by crimping. The portion 22 includes opposite laterally and axially extending riblike side portions 24 in which the internal opposed surfaces 26, 28 of the wall of the bore 30 have been brought into opposition and preferably sealed together. This results in the crimped portion of the tubing being flattened from a circular or cylindrical configuration to an elongated oval with the lateral rib portions 24 falling on the major axis of the oval while the curved opposed surfaces 29 generally fall on the minor axis of the oval.

When a prior art cylindrical tubing is subjected to a transverse force, the tubing can be collapsed to a position whereby the opposed surfaces of the internal wall of the bore abut one another in a flat line. However, due to the nature of the tubing there is a tendency for the extremity of the contacting wall, due to the short radius of curvature in the opposed edges, to leave an unclosed portion of the tubing in the form of teardrops in cross section. It has been found that the tubing will "cold flow" or relax and the size and configuration of the teardrop openings under compressive load will vary. They will either prevent total closure of the tubing or will close up and eliminate passage of liquids which were intended to be passed. When a transverse force, is applied to the tubing shown in FIGS. 6 and 7, the tubing will, upon application of sufficient force assume a configuration to completely collapse the tubing. The crimping of portions 24 results in an elimination of the teardrop openings and the "cold flow" problem.

One embodiment of the present invention of clamping means can be found in FIGS. 1 through 5, the clamp 100 includes two substantially rigid arcuate members 102 and 104 having the convex surfaces in opposition and a ringlike member 106 slideably embracing the members to maintain them in juxtaposed relation. Each of said arcuate means 102 and 104 is a generally rigid striplike member having a radius of curvature and a circumferential extent which define equal segments of a circle. They each have substantially parallel outer edges and spaced reference surfaces, 110–112 and 114–116, respectively, which are adjacent to the outer edges and which serve as relatively smooth bearing areas for the segments when brought into their opposed convex relationship. Surfaces 110 and 114 each have a plurality of spaced protuberances or fingerlike means 120 while spaced parallel surfaces 112 and 116 respectively each have a like number of spaced cavities 122 which are complementary in shape to the protuberances 120 and when mated, i.e. when surfaces 110 and 116 are brought into juxtaposition and surfaces 112 and 114 are juxtaposed, the protuberances 120 will be readily accepted in the cavities 122 and cause a positive mating of the two arcuate members 102 and 104 as they are rocked relative to each other in much the same fashion as a rack and pinion.

Each of the arcuate members, intermediate the bearing surfaces, is provided with a varying depth groove or channel means. The groove or channel 130 in arcuate member 102 and channel 132 in member 104 both have their greatest depth, relative to the bearing surfaces, at the right-hand extremity of the members, as viewed in the drawing.

Arcuate member 102 is provided, at the end of its channel having its greatest depth with an upstanding wall member 140 having an aperture 142 with laterally extending slots 144 for acceptance of a crimped tube 20 of the type set forth above. The free extremity of wall 140 is reversely bent as at 146 and includes a central, substantially rigid slot means 148 for purposes best set forth hereinafter. At the opposite mating end of member 104 there is provided a similar laterally extending wall 150 having an aperture 152 which includes the laterally extending slot 154 for purposes of orienting the rib 24 of crimped tube 20. Member 102 is provided with a lead-in chamfer 158 at one end of channel 130 and member 104 has a similar chamfer 160 at the mating end of channel 132. When the two arcuate members 102 and 104 are brought into opposition as best seen in cross section in FIG. 4, the portions 158 and 160 form a lead-in from the aperture 142 to the largest end of the chamber formed by the channels 130–132 and closed off or contained by the contacting bearing surfaces 110–112 and 116–114 respectively.

In the present embodiment, the tubing 20, which was described previously, has been shown in dashed lines in FIG. 4 for clarity of illustration. It should be noted that under normal circumstances the tubing 20 would be bent and also pass through aperture 152 in wall 150 but this was not shown in that position for further clarity of illustration. The crimped portion 22 of the tube 20 has sufficient axial length to extend through and beyond opposite ends of a clamp 100 of the type contemplated with the lateral ribs 24 resting within the slots 144 and 154 of the two end walls 140 and 150 respectively while the curved portion 29 would rest within the balance of the apertures 142 and 152 respectively. When the clamp 100 is in the position shown in FIG. 4 in solid lines the tube 20 will have a full flow through the bore 30. As the arcuate members 102 and 104 are rocked relative to one another, to the position shown in phantom in FIG. 4, with the ringlike clamp 106 being moved toward the left, as viewed in the drawing, this would bring the shallow portions of the channels 130 and 132 into opposition and hence compress the tubing. The combined depth of channels 130 and 132 at the shallow ends is controlled so as to provide only sufficient space to be equal to or slightly less than the thickness of materials of the tubing in final compressed form.

It will be realized, with a clamp of this type, that a constant reference surface is provided by the bearing surfaces 110–112 and 116–114, respectively, as they are maintained in a fixed relative angular position by the interengagement of protuberances 120 in the recesses 122. The thickness of members 102 and 104 as measured from the bearing surfaces to the concave side of the members is substantially constant throughout their length. The ringlike member 106, includes an internal bore generally rectangular in shape and complementary to the combined thickness and width of the members 102–104 when the bearing surfaces are juxtaposed. The ring 106 can be readily applied to the clamp 100 when the members 102–104 are in the position shown in phantom in FIG. 4 with the ring 106 being telescoped over the member 150 into intimate engagement with the members 102–104. When the ring is moved to the opposite extremity, a protuberance 170 acts as a stop to prevent further movement in that direction. When a tube is positioned in the clamp, the member 106 cannot reach the opposite extremity since the combined thickness of tube and members 102–104 at the shallow end of the grooves will frictionally preclude movement of ring member 106.

Thus it can be seen that with the ring 106 maintaining the arcuate members 102–104 in positive intimate engagement on their convex rigid bearing surfaces that an accurate disposition of the depth of channels 130 and 132 with respect to one another is maintained whereby a chamber of varying size is provided which will accurately control the flow of fluids through a tubing of the type shown in FIGS. 6 and 7. With proper design of the volume of the chamber formed by channels 130 and 132 it is possible to provide a straight-line variation in the quantity of fluid flow through the tube 20 by movement of the ring clamp 106 relative to the arcuate members 102–104. To assist in the operation of clamp 106, striations or grooves 175 can be provided along the edges of members 102–104 to improve gripping by the operator.

It is often desirable to shut off or terminate the flow of fluids in intravenous feedings for given periods of time and to then recommence them at a later time. To assist in this, the narrow slot 148 is provided in the reversely bent portion 146 of wall 140. The tubing 20 can be twisted about 90° on its axis so that the crimped portion 22 will slide within the slot 148 with a rib 24 being inserted into a position at the base of the slot. This will completely collapse the tubing and cause a cessation of the fluid flow while permitting the maintenance of the clamp ring 106 at a predetermined drip rate which can be later reimposed by removal of the tubing from the stop slot 148.

A modification to the present invention is shown in FIG. 5 in which similar parts will be designated by similar numerals with the addition of the suffix "a." This device includes arcuate members 102a and 104a which have upstanding apertured walls 140a and 150a respectively. Essentially, the apertures and channels in these members are substantially identical to those previously described. The major difference in this device resides in the fact that the concave surface of the member 104a is provided with transverse alternate grooves and teeth 180 which are substantially uniformly spaced throughout a substantial portion of the segmental extent of member 104a. The clamping member in this device is a U-shaped yoke 182 which includes means to underlie the member 102a, as viewed in the drawing, and further includes a pair of apertures or journals 184 at the upper end of the arms 183 for acceptance of an axle or hub 186 of a wheellike member 188. The wheel 188 has circumferentially spaced axially extending complementary groove and tooth means for engaging the transverse grooves or ribs 180 on the arcuate member 104a. Essentially, this embodiment permits rotation of the wheel 188 by an operator's thumb which in turn engages the grooves or striations of the member 104a with the base of the U-shaped yoke sliding against the smooth concave surface of 102a which will, through the interengagement of the protuberances 120a in the recesses 122 a, result in a rocking of the members 102a and 104a relative to one another by this one-handed operation. While the previous embodiment in FIGS. 1 through 4 generally can be operated with one hand, it has been found that with certain forms of tubing, that vary with manufacturing tolerances and rigidity, that sometimes a two-handed operation is necessary. The present embodiment, however, overcomes this by providing the rolling operator 188 for mechanical movement of the various parts. Other than this controlled rocking by means of the yoke 182 and the wheel 188 the operation of the device with its known reference bearing surfaces and positive racklike movement by the interaction of protuberances 120a and recesses 122a provides the same quality controlled flow of fluids afforded by the previously described embodiment.

It will be recognized by those skilled in the art that the positive engagement of protuberances 120 in bores 122 can be eliminated without totally detracting from the operation of the device. The presence of a positive means for maintaining the relative positioning of the parts is, however, preferable since the volume of the chamber formed by the channels can be repeatedly selected by proper positioning of the ring 106 or yoke 182. While the use of an oriented crimped tube is preferred, the clamp can be used with regular cylindrical tubing.

The various clamps described herein can be fabricated from either metal or plastic. It has been found, however, that the most economical and sanitary approach is to injection mold the parts from rigid materials having a lubricious quality such as nylon.

I claim,

1. A clamp device for controlling the flow of fluids through a flexible tubing, said clamp including body means having varying depth channel means disposed in two arcuate body members having their convex surfaces in opposition, said arcuate body means defining segments of a circle, each having parallel outer edges and spaced surfaces adjacent to said outer edges which serve as convex reference bearing surfaces for the segments when brought into opposed juxtaposed relation, said surfaces, including means to positively engage complementary means on the opposed body segment to insure positive relative positioning of said body segments and their channels when they are located relative to one another, and means to maintain said body segments and their channel means in adjustable opposition whereby the flow of fluids through a tube positioned within said body means can be controlled.

2. A device of the type claimed in claim 1 wherein the deepest channel portions of each segment are in opposition, each segment having means including an orienting aperture adapted to be complemental to and to orient flattened crimped tubing relative to said channel.

3. A device of the type claimed in claim 2 wherein said body segments include extensions carrying said apertures and located at opposite ends of said clamp, at least one of said extensions including means for accepting said tubing and pinching it to totally collapse the tubing whereby all flow through the tubing is terminated.

4. A device of the type claimed in claim 1 wherein said means embracing the members is a rigid complementary ring encircling and moveable along said arcuate body members as they are rocked relative to one another.

5. A device of the type claimed in claim 1 wherein one of said body members includes a plurality of grooves and teeth spaced along its concave side, said means embracing the members including a yoke and a roller journaled in said yoke, said roller including axially extending grooves and teeth complementary to those on said body member whereby manual manipulation of said roller will result in positive rocking of said body members by engagement of said teeth on the concave surface plus the engagement of the complementary means on the convex surface.